United States Patent
Agiwal

(10) Patent No.: US 9,204,462 B2
(45) Date of Patent: Dec. 1, 2015

(54) METHOD AND SYSTEM FOR IDENTIFYING SUBSCRIBER STATIONS IN MACHINE TO MACHINE COMMUNICATION

(75) Inventor: Anil Agiwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 13/538,982

(22) Filed: Jun. 29, 2012

(65) Prior Publication Data
US 2013/0003676 A1 Jan. 3, 2013

(30) Foreign Application Priority Data
Jul. 2, 2011 (IN) .......................... 2264/CHE/2011

(51) Int. Cl.
*H04Q 7/00* (2006.01)
*H04W 74/00* (2009.01)
*H04W 72/04* (2009.01)
*H04W 76/00* (2009.01)
*H04W 88/08* (2009.01)

(52) U.S. Cl.
CPC ............ *H04W 74/008* (2013.01); *H04W 72/04* (2013.01); *H04W 76/00* (2013.01); *H04W 88/08* (2013.01)

(58) Field of Classification Search
CPC ...... H04W 72/04; H04W 88/08; H04W 76/00
USPC .................................................. 370/329, 328
See application file for complete search history.

(56) References Cited

U.S. PATENT DOCUMENTS

| 7,417,975 | B2 * | 8/2008 | Takano et al. ............... 370/335 |
| 8,737,305 | B2 * | 5/2014 | Cho et al. .................... 370/328 |
| 8,908,578 | B2 * | 12/2014 | Cho et al. .................... 370/310 |
| 8,923,254 | B2 * | 12/2014 | Park et al. .................... 370/336 |
| 2002/0114308 | A1 * | 8/2002 | Takano et al. ............... 370/342 |
| 2010/0260128 | A1 * | 10/2010 | Cho et al. .................... 370/329 |
| 2011/0134873 | A1 * | 6/2011 | Cho et al. .................... 370/329 |
| 2011/0317626 | A1 * | 12/2011 | Cho et al. .................... 370/328 |
| 2011/0317638 | A1 * | 12/2011 | Cho et al. .................... 370/329 |
| 2012/0178463 | A1 * | 7/2012 | Lin et al. ...................... 455/450 |

(Continued)

FOREIGN PATENT DOCUMENTS

EP 2573991 A2 3/2013

OTHER PUBLICATIONS

Provisional application No. 61/357,991, filed on Jun. 24, 2010.*

(Continued)

*Primary Examiner* — Chuong T Ho

(57) ABSTRACT

A method and apparatus identify a subscriber station during a bandwidth request procedure. In one embodiment, a method of identifying a subscriber station from a quick access message includes receiving the quick access message from the subscriber station connected to a base station, where the quick access message includes a station identifier (STID) and a bandwidth request (BR) index assigned to the subscriber station. The method also includes determining whether the STID in the quick access message is assigned to multiple subscriber stations. Furthermore, the method includes identifying a subscriber station associated with the quick access message using the BR index in conjunction with the STID if the STID is assigned to the multiple subscriber stations. Moreover, the method includes performing an action identified by the BR index for the identified subscriber station in response to the quick access message.

6 Claims, 11 Drawing Sheets

(56) References Cited

U.S. PATENT DOCUMENTS

| | | | |
|---|---|---|---|
| 2012/0281619 A1* | 11/2012 | Tao et al. | 370/328 |
| 2013/0058317 A1* | 3/2013 | Park et al. | 370/336 |
| 2013/0077579 A1* | 3/2013 | Cho et al. | 370/329 |
| 2013/0095821 A1* | 4/2013 | Lim et al. | 455/426.1 |

OTHER PUBLICATIONS

Provisional application No. 61/345,610, filed on May 18, 2010.*
Provisional application No. 61/482,947, filed on May 5, 2011.*
Provisional application No. 61/430,583, filed on Jan. 7, 2011.*
International Search Report dated Dec. 28, 2012 in connection with International Patent Application No. PCT/KR2012/005208, 3 pages.
Written Opinion of International Searching Authority dated Dec. 28, 2012 in connection with International Patent Application No. PCT/KR2012/005208, 4 pages.
Ming-Hung Tao, et al.; "Time-Sharing STID Addressing Scheme"; IEEE 802.16 Broadband Wireless Access Working Group, May 8, 2011, 5 pages.
Tsung-Yu Tsai, et al.; "Shared STID for M2M Devices"; IEEE 802.16 Broadband Wireless Access Working Group, May 18, 2011, 5 pages.
Ming-Hung Tao, et al.; "Shared-STID Addressing Scheme"; IEEE 802.16 Broadband Wireless Access Working Group, Mar. 11, 2011, 4 pages.
Yi-Ting Lin, et al.; "Using Predefined BR Index to Identify M2M Devices Sharing STID"; IEEE 802.16 Broadband Wireless Access Working Group, Sep. 9, 2011, 3 pages.
Extended European Search Report dated Jan. 28, 2015 in connection with European Patent Application No. 12807507.4; 7 pages.
Yang, X.; "Connection Management and QoS DG AWD Text with DG Comment Resolution"; IEEE 802.16m-09/0847; Apr. 27, 2009; 25 pages.
Tao, at al.; "Time-Sharing STID Addressing Scheme"; IEEE 0802.16p-11/0068; May 8, 2011, 5 pages.

* cited by examiner

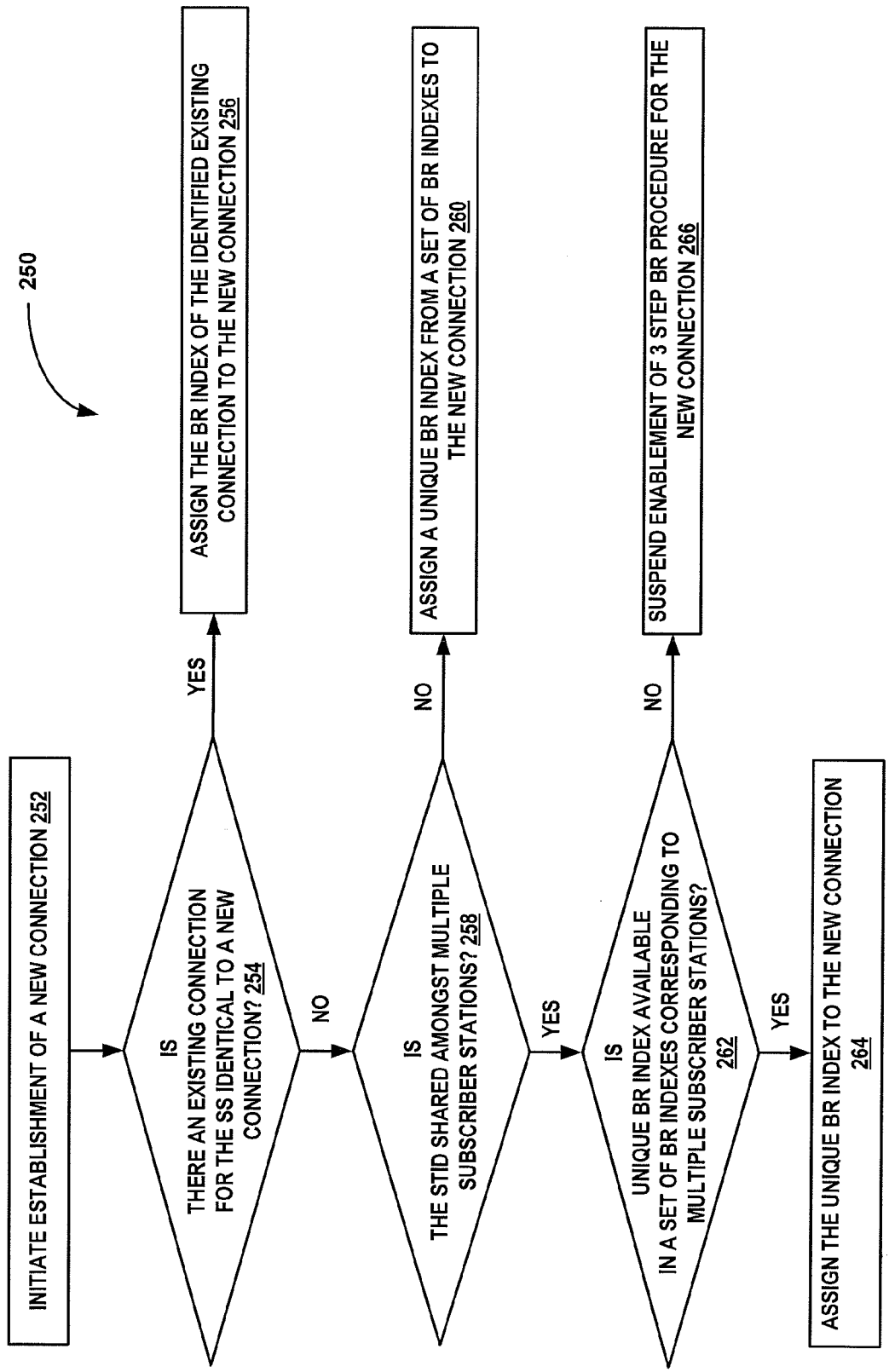

| SUBSCRIBER STATIONS | 3 STEP BR ENABLEMENT STATUS | ASSIGNED BR INDEXES |
|---|---|---|
| SS 102A, STID 'X' | 3 STEP BR ENABLED CONNECTIONS C1, C2, C3, C4 (OTHER CONNECTIONS WITHOUT 3 STEP BR MAY BE PRESENT) | 0, 1, 2, 3 |
| SS 102B, STID 'X' | 3 STEP BR ENABLED CONNECTIONS C1, C2, C3, C4 (OTHER CONNECTIONS WITHOUT 3 STEP BR MAY BE PRESENT) | 4, 5, 6, 7 |
| SS 102C, STID 'X' | 3 STEP BR ENABLED CONNECTIONS C1, C2, C3, C4 (OTHER CONNECTIONS WITHOUT 3 STEP BR MAY BE PRESENT) | 8, 9, 10, 11 |
| SS 102D, STID 'X' | 3 STEP BR ENABLED CONNECTIONS C1, C2, C3, C4 (OTHER CONNECTIONS WITHOUT 3 STEP BR MAY BE PRESENT) | 12, 13, 14, 15 |
| SS 102E, STID 'X' | 3 STEP BR ENABLED CONNECTION IS NOT PRESENT | NONE |
| SS 102F, STID 'Y' | 3 STEP BR ENABLED CONNECTIONS C1, C2, C3, C4 (OTHER CONNECTIONS WITHOUT 3 STEP BR MAY BE PRESENT) | 0, 1, 2, 3 |

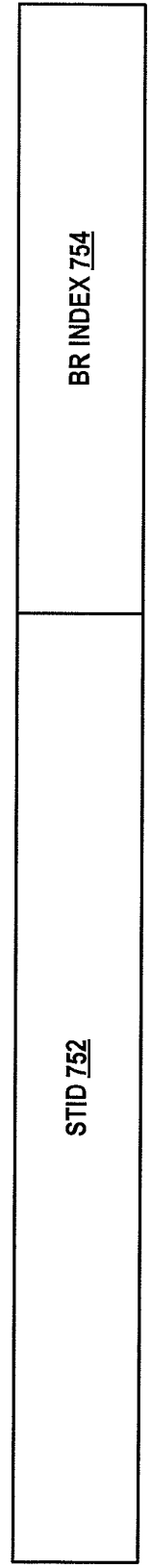
FIGURE 7A
FIGURE 7B

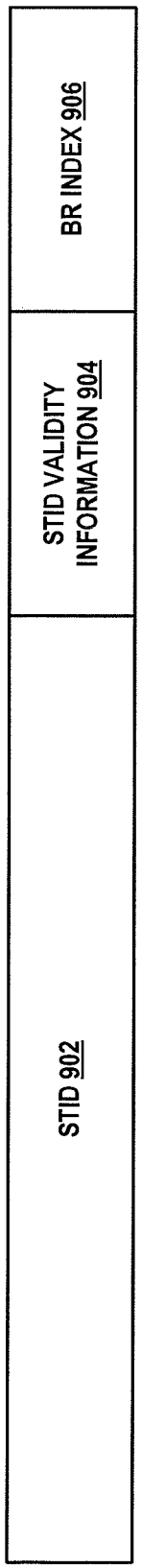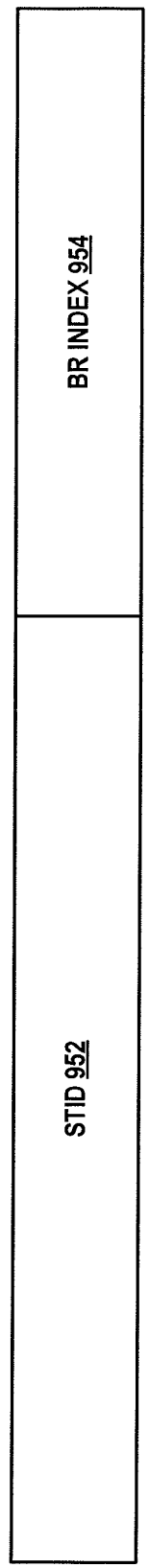
FIGURE 9A
FIGURE 9B

METHOD AND SYSTEM FOR IDENTIFYING SUBSCRIBER STATIONS IN MACHINE TO MACHINE COMMUNICATION

CROSS-REFERENCE TO RELATED APPLICATION(S) AND CLAIM OF PRIORITY

The present application is related to and claims the benefit under 35 U.S.C. §119(a) of an Indian Provisional Patent Application filed in the Indian Patent Office on Jul. 2, 2011 and assigned Serial No. 2264/CHE/2011 and an Indian Non-Provisional Patent Application filed in the Indian Patent Office on Jun. 22, 2012 and assigned Serial No. 2264/CHE/2011, the entire disclosure of which is incorporated herein by reference.

TECHNICAL FIELD OF THE DISCLOSURE

The present disclosure generally relates to the field of mobile broadband systems, and more particularly relates to identifying subscriber stations during a bandwidth request procedure in a broadband network environment.

BACKGROUND OF THE DISCLOSURE

A mobile broadband system is a wireless communication system consisting of one or more base stations deployed over a geographical region to provide wireless connectivity to subscriber stations within a coverage area of respective base stations. The mobile broadband system is based on various standards such as the Institute of Electronic and Electric Engineers (IEEE) 802.16-based WiMAX standard and its evolution to IEEE 802.16m, and typically provides various types of services such as voice, packet data and so onto subscriber stations via one or more base stations. Usually, each base station in the wireless communication network is configured to provide various types of services (e.g., voice, data, multimedia services, and the like) to subscriber stations that are operating within the geographical area served by the mobile broadband network.

In a mobile broadband system, a base station assigns an address to a subscriber station when the subscriber station performs a network entry with the base station. Typically, the base station assigns a 12 bit station identifier (STID) to subscriber stations. Sometimes, the base station may assign the same STID to multiple subscriber stations in order to support a large number of subscriber stations in a geographical area. Additionally, the base station may assign a specific time interval (e.g., frame interval) along with the STID to uniquely identify the subscriber stations to whom the same STID is assigned. Often, the base station assigns a 12-bit STID to subscriber stations for allocating resources and communicating control information with subscriber stations.

Currently, the base station assigns resources to subscriber stations through a three-step BR procedure. For example, in one three-step BR procedure, a subscriber station sends a bandwidth request to the base station on randomly selected BR opportunity requesting assignment of resources for communicating data with the base station. The bandwidth request includes a preamble sequence and a quick access message. The quick access message consists of a 12-bit STID assigned to the subscriber station and a 4-bit BR index. The base station transmits an acknowledgment in a Bandwidth Request A MAP Information Element (BR ACK A MAP IE) message upon successfully decoding the preamble sequence and the quick access message. Then, the base station transmits an uplink grant to the subscriber station as requested in the quick access message. Accordingly, the subscriber station uses the uplink grant to transmit data to the base station.

If the base station fails to decode the quick access message and successfully decodes the preamble sequence, the base station grants resources for sending a bandwidth request with STID header to the subscriber station. As a result, the subscriber station transmits a bandwidth request with STID header using the resource. The base station transmits an uplink grant to the subscriber station upon receiving the bandwidth request with STID header. Accordingly, the subscriber station uses the uplink grant to transmit data to the base station.

However, when a subscriber station, sharing a STID with other subscriber station(s), sends a preamble sequence and quick access message to the base station on a randomly selected BR opportunity, the base station fails to uniquely identify the subscriber station which has requested assignment of resources using the STID. This is because more than one subscriber station has been assigned the same STID by the base station. Although the base station has assigned a specific time interval along with the STID to uniquely identify the subscriber station from other subscriber stations sharing the same STID, a quick access message may not carry the specific time interval associated with the subscriber station due to size constraints. As a consequence, the base station may fail to assign a resource grant to the subscriber station sharing the same STID with other subscriber stations in the geographical area.

SUMMARY OF THE DISCLOSURE

To address the above-discussed deficiencies of the prior art, it is a primary object to provide a method and apparatus for identifying a subscriber station during a bandwidth request procedure.

In accordance with one aspect of the present disclosure, there is provided a method of assigning bandwidth request (BR) indexes to subscriber stations in a broadband network environment. The method includes determining whether a station identifier (STID) is shared amongst multiple subscriber stations by a base station. The method also includes assigning a unique BR index selected from a set of BR indexes to one or more connections associated with each of the multiple subscriber stations if the STID is shared amongst the multiple subscriber stations, wherein the set of BR indexes is associated with the multiple subscriber stations sharing the STID. The method further includes assigning a unique BR index selected from a set of BR indexes to one or more connections associated with a single subscriber station if the STID is assigned to the single subscriber station, wherein the set of BR indexes corresponds to the unique STID associated with the single subscriber station.

In accordance with another aspect of the present disclosure, there is provided an apparatus comprising a processor, and a memory coupled to the processor, wherein the memory includes a bandwidth request (BR) index assignment module. The module is configured to determine whether a station identifier (STID) is shared amongst multiple subscriber stations. The module is also configured to assign a unique BR index selected from a set of BR indexes to one or more connections associated with each of the multiple subscriber stations if the STID is shared amongst the multiple subscriber stations, wherein the set of BR indexes is associated with the multiple subscriber stations sharing the STID. The module is further configured to assign a unique BR index selected from a set of BR indexes to one or more connections associated with a single subscriber station if the STID is assigned to the single subscriber station, wherein the set of BR indexes corresponds to the unique STID associated with the single subscriber station.

In accordance with another aspect of the present disclosure, there is provided a method of identifying a subscriber station from a quick access message. The method includes receiving a quick access message from a subscriber station connected to a base station, wherein the quick access message comprises a station identifier (STID) and a bandwidth request (BR) index assigned to the subscriber station. The method also includes determining whether the STID in the quick access message is assigned to multiple subscriber stations. The method further includes identifying a subscriber station associated with the quick access message using the BR index in conjunction with the STID if the STID is assigned to the multiple subscriber stations. The method still further includes performing an action identified by the BR index for the identified subscriber station in response to the quick access message.

In accordance with another aspect of the present disclosure, there is provided an apparatus comprising a processor, and a memory coupled to the processor, wherein the memory comprises a subscriber station (SS) identification module. The module is configured to receive a quick access message from a subscriber station, wherein the quick access message comprises a station identifier (STID) and a bandwidth request (BR) index assigned to the subscriber station, and determine whether the STID in the quick access message is assigned to multiple subscriber stations. The module is also configured to identify a subscriber station associated with the quick access message using the BR index in conjunction with the STID if the STID is assigned to the multiple subscriber stations, and perform an action identified by the BR index for the identified subscriber station in response to the quick access message.

In accordance with another aspect of the present disclosure, there is provided a method of identifying a subscriber station from a quick access message. The method includes receiving a quick access message from a subscriber station connected to a base station, wherein the quick access message comprises a station identifier (STID) assigned to the subscriber station and at least one of STID validity information and a Bandwidth Request (BR) index. The method also includes determining whether the STID in the quick access message is assigned to multiple subscriber stations. The method further includes identifying a subscriber station associated with the quick access message using the STID validity information in conjunction with the STID if the STID is assigned to the multiple subscriber stations, and performing an action for the identified subscriber station in response the quick access message.

In accordance with another aspect of the present disclosure, there is provided an apparatus comprising a processor, and a memory coupled to the processor, wherein the memory comprises a subscriber station (SS) identification module. The module is configured to receive a quick access message from a subscriber station, wherein the quick access message comprises a station identifier (STID) assigned to the subscriber station and at least one of STID validity information and a Bandwidth Request (BR) index, and determine whether the STID in the quick access message is assigned to multiple subscriber stations. The module is also configured to identify a subscriber station associated with the quick access message using the STID validity information in conjunction with the STID if the STID is assigned to the multiple subscriber stations, and perform an action for the identified subscriber station in response the quick access message.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2B illustrates a method of assigning a bandwidth request index to a subscriber station in a broadband network environment, according to another embodiment.

FIG. 3 illustrates assignment of BR indexes to subscriber stations with the same station identifier (STID) in a broadband network environment.

FIGS. 7A and 7B illustrate quick access message formats, according to another embodiment.

FIGS. 9A and 9B illustrate quick access message formats, according to yet another embodiment.

The drawings described herein are for illustration purposes only and are not intended to limit the scope of the present disclosure in any way.

DETAILED DESCRIPTION OF THE DISCLOSURE

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

In the document, the term 'subscriber station' includes a mobile station, a laptop, with embedded modem, a Universal Serial Bus (USB) dongle, a consumer process equipment, or any other device capable of communicating with a base station in a broadband network environment.

Figure 1:
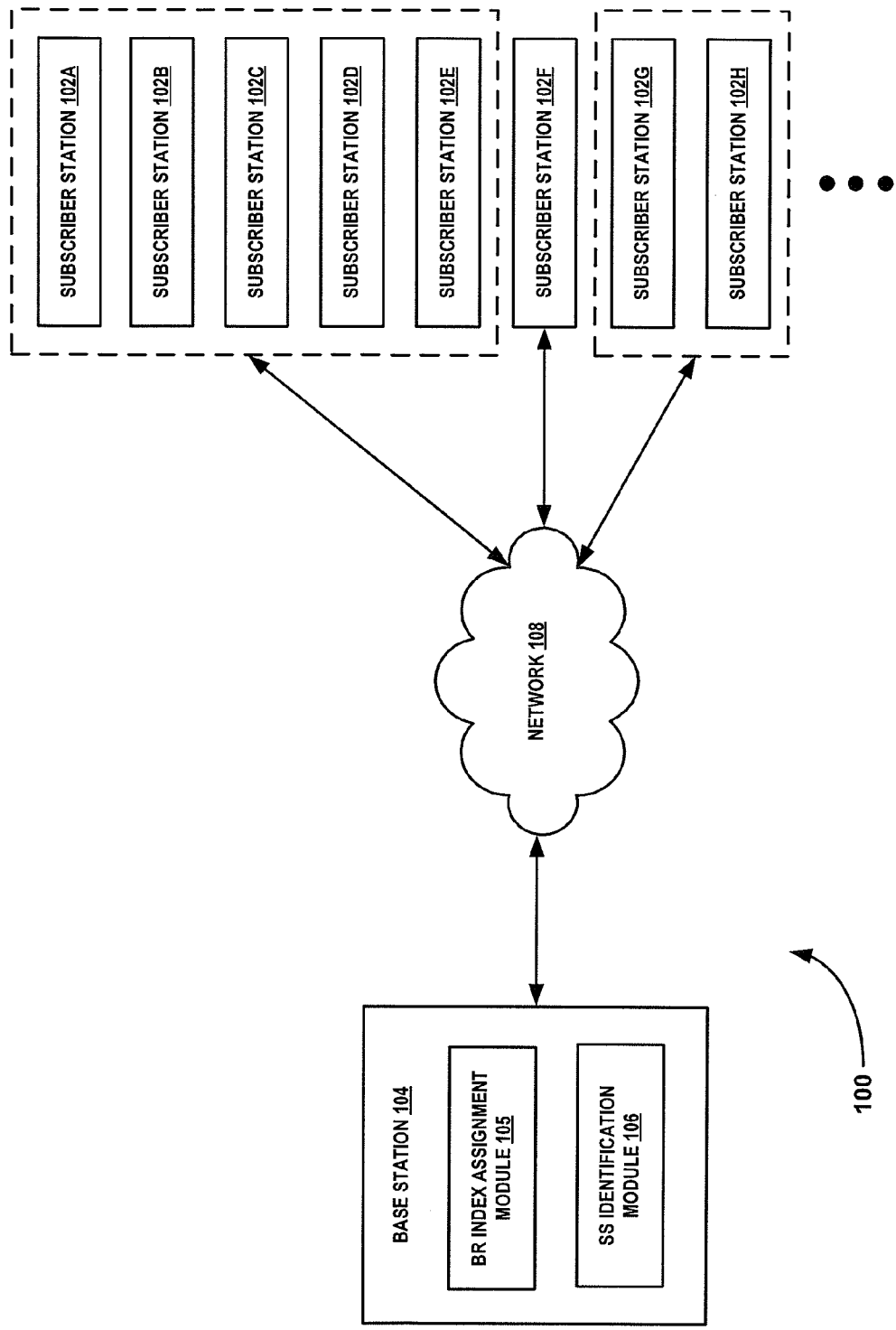
FIG. 1 is a block diagram of a broadband network system, according to one embodiment.

FIG. 1 is a block diagram of a broadband network system 100, according to one embodiment. In FIG. 1, the broadband network system 100 includes subscriber stations 102A-102H, and a base station 104 connected to the subscriber stations 102A-102H via a network 108. The subscriber stations 102A-102H may include legacy subscriber stations and machine to machine (M2M) devices. According to the present disclosure, the base station 104 includes a bandwidth request (BR) index assignment module 105 and a subscriber station (SS) identification module 106.

When a new connection for a subscriber station is being established, the BR index assignment module 105 determines whether the station identifier (STID) of the subscriber station is shared with other subscriber stations. For example, as depicted, subscriber stations 102A-102E (in the dotted rectangle) share the same STID while the subscriber station 102F is assigned a unique STID. If the subscriber stations 102A-102E share the same STID, then the BR index assignment module 105 assigns a unique BR index from a set of distinct BR indexes associated with the multiple subscriber stations 102A-102E. It is noted that the BR indexes assigned to multiple subscriber stations 102A-102E sharing the same STID are different. In one implementation, the BR index assignment module 105 assigns a unique BR index from a set of sixteen (16) distinct BR indexes. The BR index is assigned such that the base station 104 identifies a subscriber station sending a request for allocation of resources through a three-step BR procedure based on the BR index and the STID of the subscriber station 102A. Thus, the unique BR index is used for identifying the BR action as well to identify a subscriber station requesting resource allocation.

When no unique BR index is available, then the BR index assignment module 105 does not enable the three-step BR procedure for the new connection of the subscriber station 102A. This means that if the subscriber station 102A determines to request allocation of resources for the new connection, the subscriber station 102A cannot request the resource allocation through a three-step BR procedure.

If the STID of the subscriber station is not shared, then the BR index assignment module 105 assigns a unique BR index from a set of distinct BR indexes associated with the subscriber station 102F to the new connection. It is understood that the set of BR indexes associated with the multiple subscriber stations 102A-102E and the set of BR indexes associated with the single subscriber station 102F are identical.

Now consider that one of subscriber stations 102A-102H determines to request allocation of resources for sending data to the base station 104. In such a situation, the subscriber station transmits a preamble sequence and quick access message encoding a STID and a BR index assigned to the subscriber station over a randomly selected BR opportunity. The SS identification module 106 in the base station 104 determines whether the STID received in the quick access message is shared amongst multiple subscriber stations 102A-102E. If the STID is shared amongst multiple subscriber stations 102A-102E, then the SS identification module 106 identifies the subscriber station (e.g., subscriber station 102A), from whom the quick access message is received, using the BR index and the STID received in the quick access message. Accordingly, the SS identification module 106 performs a BR action identified by the BR index for the identified subscriber station 102A. For example, the BR action identified by the BR index may involve a grant of resources to the identified subscriber station 102A.

If the STID is assigned to a single subscriber station, the SS identification module 106 identifies the subscriber station (e.g., subscriber station 102F) and performs a BR action identified by the BR index for the identified subscriber station.

Figure 2A:
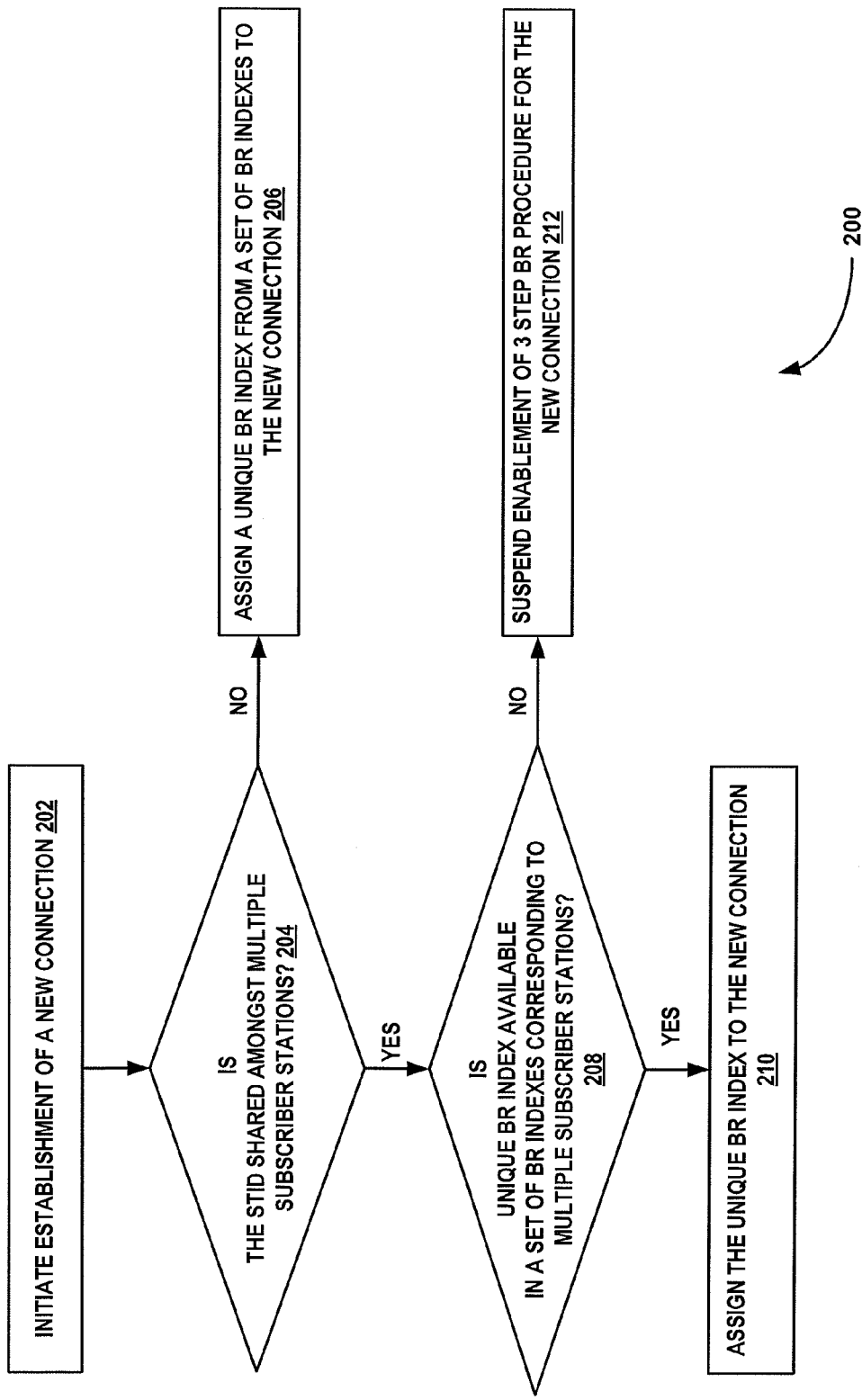
FIG. 2A illustrates a method of assigning a bandwidth request (BR) index to a subscriber station in a broadband network environment, according to one embodiment.

FIG. 2A is a process flowchart 200 illustrating a method of assigning a bandwidth request (BR) index to a subscriber station in a broadband network environment, according to one embodiment. At block 202, the establishment of a new connection between a subscriber station and the base station 104 is initiated. In one embodiment, the new connection establishment is initiated by the subscriber station. In another embodiment, the new connection establishment is initiated by the base station 104.

At block 204, it is determined whether a station identifier (STID) associated with the subscriber station is shared amongst multiple subscriber stations (e.g., the multiple subscriber stations 102A-102E). If the STID is not shared amongst the multiple subscriber stations 102A-102E, then at block 206, a unique BR index selected from a set of BR indexes is assigned to the new connection associated with the subscriber station (e.g., the subscriber station 102F), where the set of BR indexes is associated with the single subscriber station 102F and the STID of the single subscriber station 102F is not shared with another subscriber station.

If the STID is shared amongst the multiple subscriber stations 102A-102E, then at block 208, it is determined whether a unique BR index is available in a set of BR indexes associated with the multiple subscriber stations 102A-102E with the same STID. If the unique BR index is available, then at block 210, the unique BR index is assigned to the new connection associated with the subscriber station 102A. If the unique BR index is unavailable, then at block 212, a three-step BR procedure is not enabled for the new connection that is being established between the subscriber station 102A and the base station 104.

FIG. 2B is a process flowchart 250 illustrating a method of assigning a bandwidth request index to a subscriber station in a broadband network environment, according to another embodiment. At block 252, the establishment of a new connection between a subscriber station and the base station 104 is initiated. In one embodiment, the new connection establishment is initiated by the subscriber station. In another embodiment, the new connection establishment is initiated by the base station 104.

At block 254, it is determined whether there is an existing connection associated with the subscriber station having a scheduling type and BR size identical to a new connection that is being established between the subscriber station and the base station 104. If the existing connection is found, then at block 256, the unique BR index associated with the existing connection is assigned to the new connection associated with the subscriber station. If the existing connection is not found, then at block 258 it is determined whether a STID associated with the subscriber station is shared amongst multiple subscriber stations (e.g., the multiple subscriber stations 102A-102E). If the STID is not shared amongst the multiple subscriber stations 102A-102E, then at block 256, a unique BR index selected from a set of BR indexes is assigned to the new connection associated with the subscriber station (e.g., the subscriber station 102F), where the set of predefined BR indexes is associated with the single subscriber station 102F and the STID of the subscriber station 102F is not shared with another subscriber station.

If the STID is shared amongst the multiple subscriber stations 102A-102E, then at block 262, it is determined whether a unique BR index is available in a set of BR indexes associated with the multiple subscriber stations 102A-102E with the same STID. If the unique BR index is available, then at block 264, the unique BR index is assigned to the new connection associated with the subscriber station. If the unique BR index is unavailable, then at block 266, a three-step BR procedure is not enabled for the new connection that is being established between the subscriber station 102A and the base station 104.

FIG. 3 is a tabular representation 300 illustrating assignment of BR indexes to subscriber stations with the same STID in a broadband network environment. Consider that subscriber stations 102A-E are assigned STID 'X' and a three-step BR procedure is enabled for the subscriber stations 102A-102D. The BR indexes are assigned to connections associated with the subscriber stations 102A-102D from a set of 16 distinct BR indexes. As depicted, the connections associated with the subscriber stations 102A are assigned the predefined BR indexes '0' to '3'. The connections associated with the subscriber stations 102B are assigned the predefined BR indexes '4' to '7'. The connections associated with the subscriber stations 102C are assigned the predefined BR indexes '8' to '11' while the connections associated with the subscriber stations 102D are assigned the predefined BR indexes '12' to '15'. Thus, the connections across the subscriber stations 102A-102D are assigned distinct BR indexes selected from the set of sixteen (16) distinct BR indexes.

It can be seen that the subscriber station 102E having same STID 'X' as that of the subscriber stations 102A-102D is not assigned any BR index, as the subscriber station 102E does not have any three-step BR enabled connections. The subscriber station 102F has a STID different than the subscriber stations 102A-102E and hence any BR index which is assigned to subscriber stations 102A-102E can be assigned to connections associated with the subscriber station 102F. Thus, the set of BR indexes associated with the multiple subscriber stations 102A-102E with the same STID 'X' and the set of BR indexes associated with the single subscriber station 102F having the unique STID 'Y' have same BR indexes. As illustrated in FIG. 2B, the BR index assigned to a connection of the subscriber station 102F may be assigned to another connection of the subscriber station 102F when the parameters such as scheduling type and BR size of both connections is same.

Figure 4:
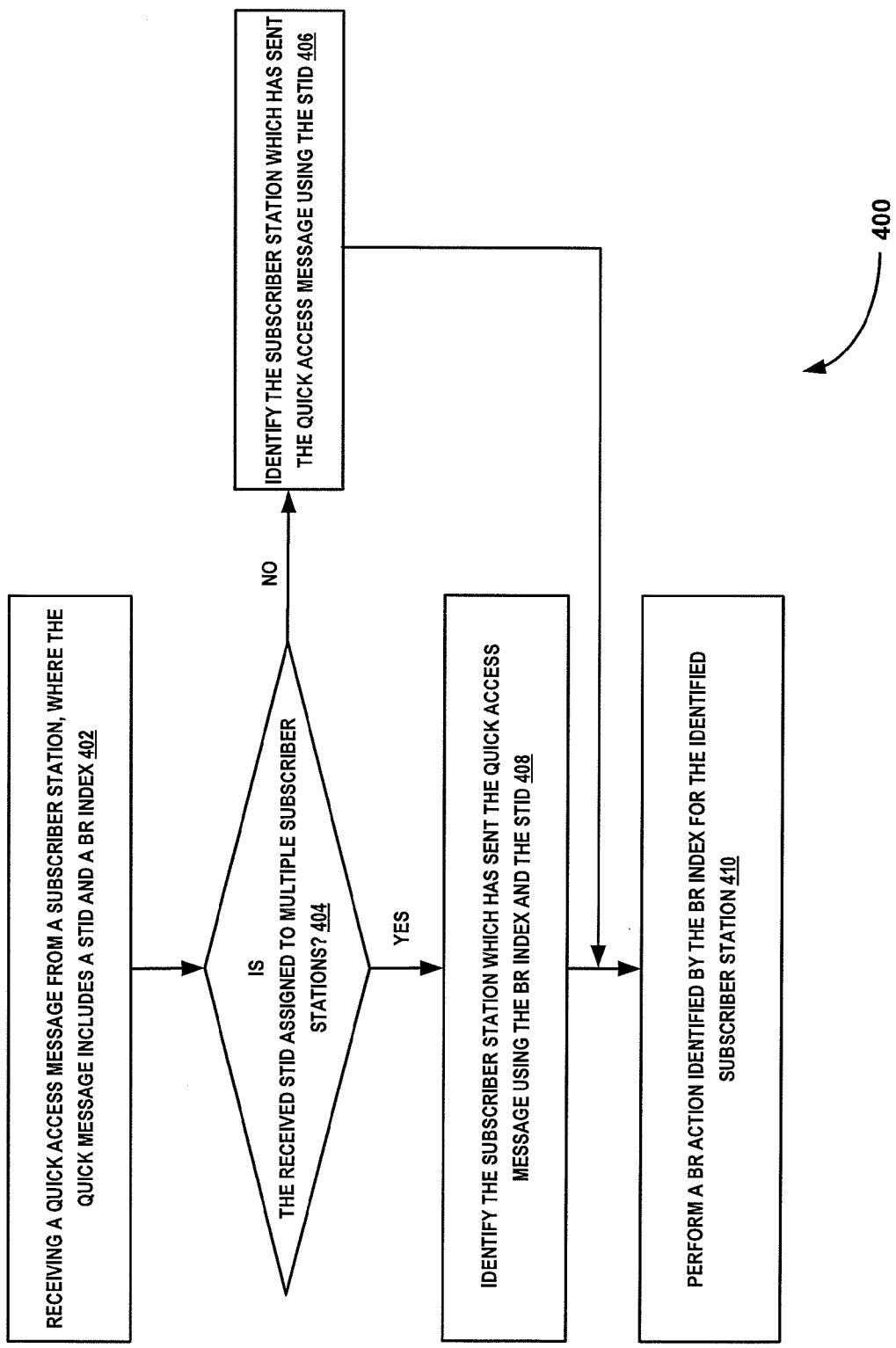
FIG. 4 illustrates a method of identifying a subscriber station using a STID and a BR index in a quick access message, according to one embodiment.
Figure 5:
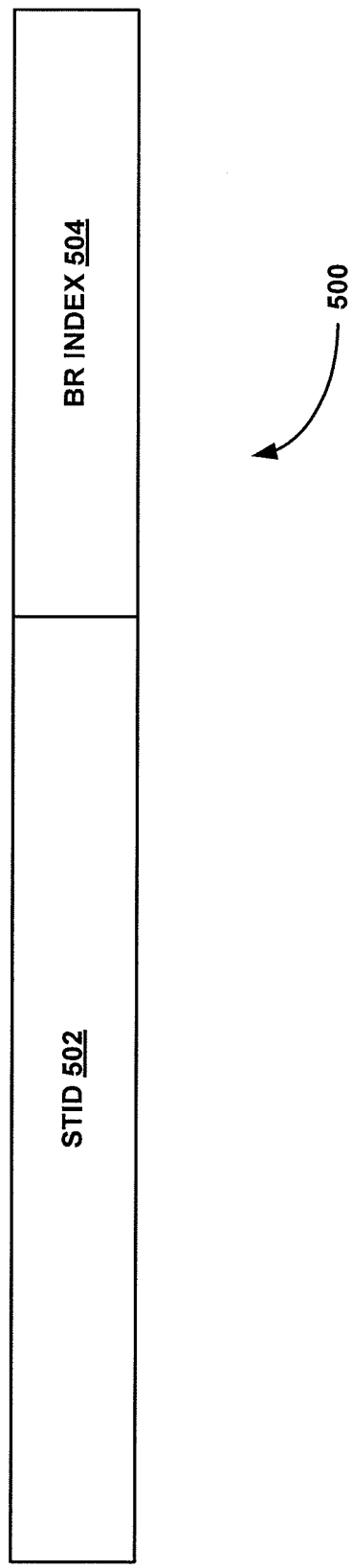
FIG. 5 illustrates a quick access message, according to one embodiment.

FIG. 4 is a process flowchart 400 illustrating a method of identifying a subscriber station using a STID and a BR index in a quick access message, according to one embodiment. At block 402, a quick access message is received from a subscriber station. The quick access message includes a STID 502 and a BR index 504 assigned to the subscriber station as illustrated in FIG. 5. At block 404, it is determined whether the STID received in the quick access message is assigned to multiple subscriber stations 102A-102E. If the STID is assigned to a single subscriber station, then at block 406, the subscriber station (e.g., the subscriber station 102F) which has sent the quick access message is identified using the STID in the quick access message and an action identified by the BR index in the quick access message is performed for the identified subscriber station 102F, at block 410.

If the STID is assigned to the multiple subscriber stations (e.g., subscriber stations 102A-102E), then at block 408, the subscriber station (e.g., subscriber station 102A) associated with the quick access message is identified using the BR index in conjunction with the STID received in the quick access message. In some embodiments, the subscriber station associated with the BR index received in the quick access message is identified from the multiple subscriber stations sharing the STID received in the quick access message. The BR index is a unique BR index assigned by the base station 104 to the subscriber station 102A during connection establishment so that the base station can identify a subscriber station associated with the quick access message using the unique BR index when the STID associated with the subscriber station is shared with other subscriber station(s). At block 410, an action identified by the BR index received in the quick access message is performed for the identified subscriber station 102A.

Figure 6:
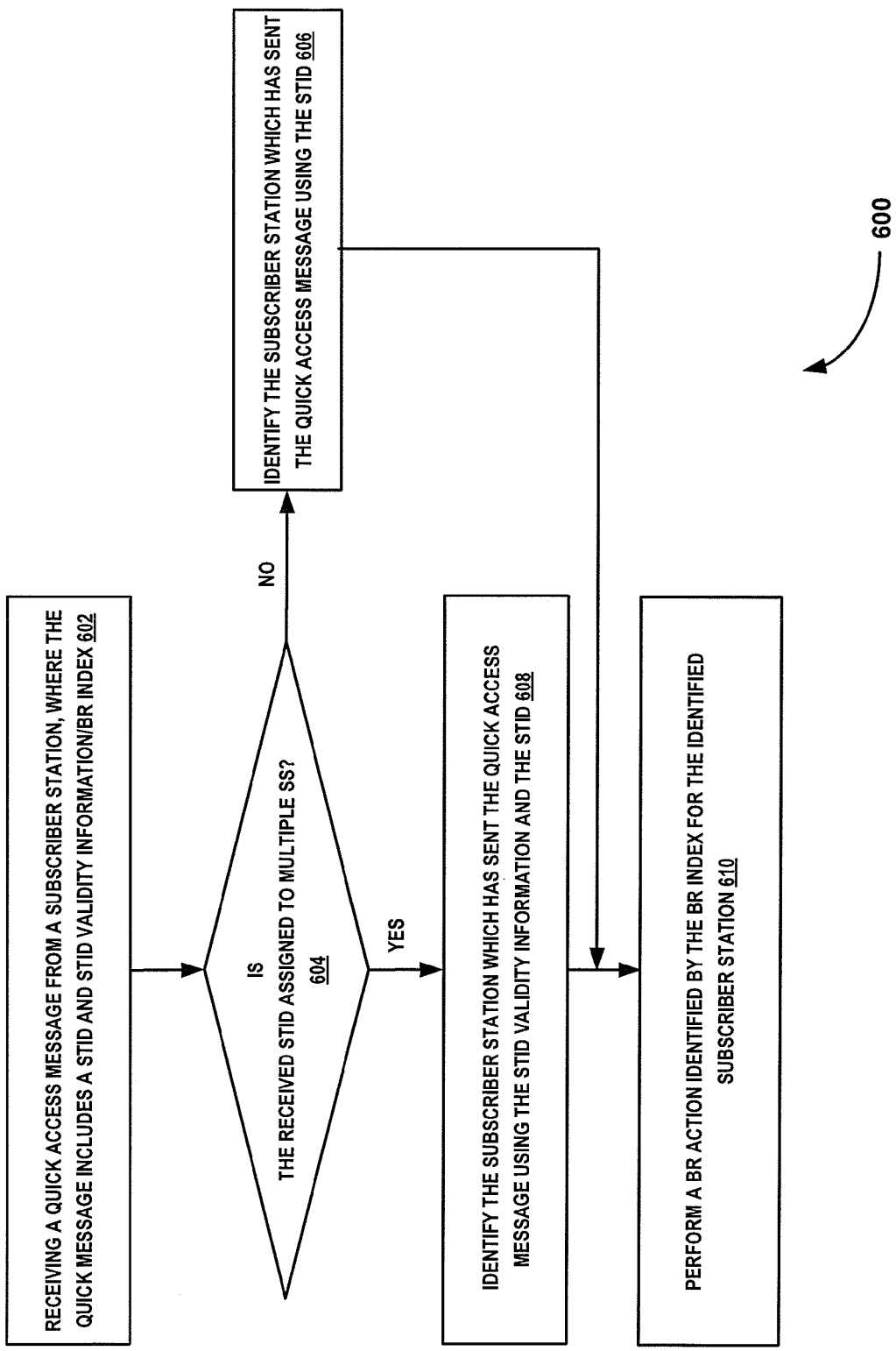
FIG. 6 illustrates a method of identifying a subscriber station using a STID and STID validity information in a quick access message, according to another embodiment.

FIG. 6 is a process flowchart 600 illustrating a method of identifying a subscriber station associated with a quick access message, wherein the quick access message carries a STID and one of a BR index and STID validity information, according to another embodiment. At block 602, a quick access message is received from a subscriber station. In one embodiment, the subscriber station transmits a specific quick access message based on whether or not the STID is shared with other subscriber stations. If the STID is shared amongst multiple subscriber stations, the quick access message includes a STID 702 and STID validity information 704, as illustrated in FIG. 7A. However, if the STID is assigned to single subscriber station, the quick access message includes a STID 752 and a BR index 754 assigned to the subscriber station, as illustrated in FIG. 7B.

At block 604, it is determined whether the STID received in the quick access message is assigned to multiple subscriber stations. If the STID is assigned to a single subscriber station, then at block 606, the BR index is decoded from the quick access message and the subscriber station (e.g., the subscriber station 102E) that has sent the quick access message is identified using the STID in the quick access message, and an action identified by the BR index received in the quick access message is performed for the identified subscriber station 102E, at block 610.

If the STID is assigned to the multiple subscriber stations (e.g., subscriber stations 102A-102E), then at block 608, the STID validity information is decoded from the quick access message, and the subscriber station (e.g., subscriber station 102A) associated with the quick access message is identified using the STID validity information in conjunction with the STID received in the quick access message. In some embodiments, the STID validity information includes a STID validity offset indicating a time interval in which the STID in the quick access message is valid. It is noted that the STID validity offset is assigned to the subscriber station during the assignment of a STID. In these embodiments, the subscriber station that is assigned the time interval indicated in the STID validity offset is identified as the sender of the quick access message. The STID validity information may include parameters other than the STID validity offset which indicates a time interval in which the assigned STID is valid. At block 610, a BR action identified by the STID is performed for the identified subscriber station 102A. It is noted that, when the STID is shared, the BR action is pre-defined or assigned during assignment of the STID to the subscriber station.

In accordance with the embodiments described in FIG. 6, on receiving the quick access message, the base station 104 decodes the STID from the quick access message and determines whether the STID is assigned to multiple subscriber stations. If the STID is assigned to multiple subscriber stations, the base station 104 decodes the STID validity information from the quick access message. If the STID is assigned to a single subscriber station, the base station 104 decodes the BR index from the quick access message.

Figure 8:
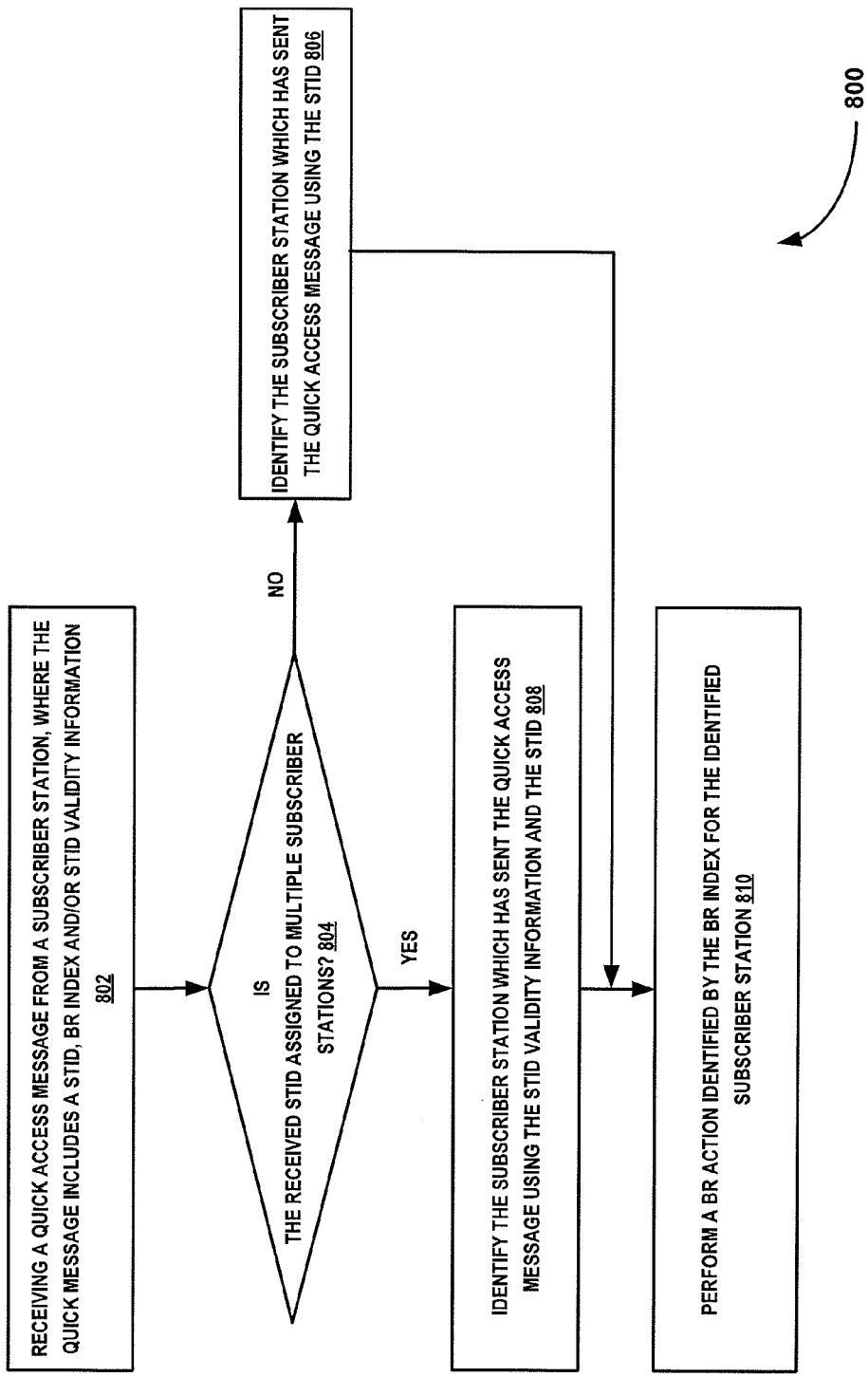
FIG. 8 illustrates a method of identifying a subscriber station using a STID and STID validity information in a quick access message, according to yet another embodiment.

FIG. 8 is a process flowchart 800 illustrating a method of identifying a subscriber station associated with a quick access message, where the quick access message carries a STID, BR index and/or STID validity information, according to yet another embodiment. At block 802, a quick access message is received from a subscriber station. In one embodiment, the subscriber station transmits a specific quick access message based on whether the STID is shared with other subscriber stations or not. If the STID is shared amongst multiple subscriber stations, the quick access message includes a STID 902, STID validity information 904, and a BR index 906, as illustrated in FIG. 9A. In one embodiment, the sum of sizes of STID validity information 904 and the BR index 906 is equal to four bits. If the STID is assigned to a single subscriber station, the quick access message includes a STID 952 and a BR index 954 assigned to the subscriber station, as illustrated in FIG. 9B.

At block 804, it is determined whether the STID in the quick access message is assigned to multiple subscriber stations. If the STID is assigned to a single subscriber station, then at block 806, the BR index is decoded from the quick access message, and the subscriber station (e.g., the subscriber station 102F) which has sent the quick access message is identified using the STID in the quick access message and an action identified by the BR index in the quick access message is performed for the identified subscriber station 102F, at block 810.

If the STID is assigned to multiple subscriber stations (e.g., subscriber stations 102A-102E), then at block 808, the STID validity information and the BR index are decoded from the quick access message, and the subscriber station (e.g., subscriber station 102A) associated with the quick access message is identified using the STID validity information in conjunction with the STID in the quick access message. In some embodiments, the STID validity information includes a STID validity offset indicating a time interval in which the STID in the quick access message is valid. In these embodiments, the subscriber station which is assigned the time interval indicated in the STID validity offset is identified as the sender of the quick access message. At block 810, a BR action identified by the BR index in the quick access message is performed for the identified subscriber station 102A. The BR action is defined during connection establishment when the associated BR index is assigned to the subscriber station. When the STID is shared, the BR action is pre-defined or assigned during assignment of STID to the subscriber station.

In accordance with the embodiments described in FIG. 8, on receiving the quick access message, the base station 104 decodes the STID from the quick access message and determines whether the STID is assigned to multiple subscriber stations. If the STID is assigned to the multiple subscriber stations, the base station 104 decodes the STID validity information and the BR index from the quick access message. If the STID is assigned to a single subscriber station, the base station 104 decodes the BR index from the quick access message.

Apart from the embodiments described in FIG. 8, the base station 104 shares specific STIDs amongst multiple subscriber stations. In some embodiments, the base station 104 selects a specific STID from a $STID_{sharingset}$ that includes STIDs whose 'n' most significant bits (MSBs) are ones, where the value 'n' is equal to size of the STID validity offset. When sending a quick access message to the base station 104, a subscriber station sharing a STID with other subscriber stations encodes a '12-n' bit STID, with 'n' bit STID validity offset and 4-bit BR index. If the STID is not shared, the subscriber station transmits a quick message that includes a 12-bit STID and a 4-bit BR index. Also, the BR preamble sequences transmitted by the subscriber station sharing the STID and BR preamble sequences transmitted by the subscriber station not sharing the STID are different. Therefore, the base station 104 understands from the BR preamble sequences as to whether the STID is shared or not shared.

Apart from the embodiments described in FIG. 8, the base station 104 shares specific STIDs amongst multiple subscriber stations. In some embodiments, the base station 104 selects a specific STID from a $STID_{sharingset}$ that includes STIDs whose 'n' most significant bits (MSBs) are ones, where the value 'n' is equal to the size of the STID validity offset. While sending a quick access message to the base station 104, a subscriber station sharing a STID with other subscriber stations encodes a '12-n' bit STID, with 'n' bit STID validity offset and 4-bit BR index. If the STID is not shared, the subscriber station transmits a quick message that includes a 12-bit STID and 4-bit BR index. Also, the BR preamble sequences transmitted by the subscriber station sharing the STID and BR preamble sequences transmitted by the subscriber station not sharing the STID are different. Therefore, the base station 104 understands from the BR preamble sequences as to whether the STID is shared or not shared.

In order to identify the subscriber station which has sent the BR with STID header when the multiple subscriber stations share the same STID, a new BR with STID header containing a STID validity offset is transmitted to the base station. This is achieved by reducing the BR size in the BR with STID header. For example, the BR size can be reduced from nineteen (19) bits to sixteen (16) bits to allow addition of a 4-bit STID validity offset field. It is appreciated that all other fields in new BR with STID header remain the same as compared to a conventional BR with STID header. This helps maintain the size of the BR with STID header to six (6) bytes and does not require the base station 104 to identify which subscriber station has sent the BR preamble sequence while allocating a grant for the BR with STID header.

Alternatively, a new BR with STID header having a size of seven (7) bytes is defined. The new BR with STID header includes all the fields as that of a conventional BR with STID header with the same sizes. The size is increased from six (6) bytes to seven (7) bytes due to the addition of a STID validity offset field in the BR with STID header. In this situation, the base station determines whether it should allocate six (6) bytes or seven (7) bytes for the BR with STID header when the base station 104 receives a BR preamble sequence. This can be achieved through using distinct BR preamble sequences for the subscriber stations which have been assigned the same STID. As a result, the base station 104 can determine the size of allocation for the BR with STID header based on the BR preamble sequence.

Figure 10:
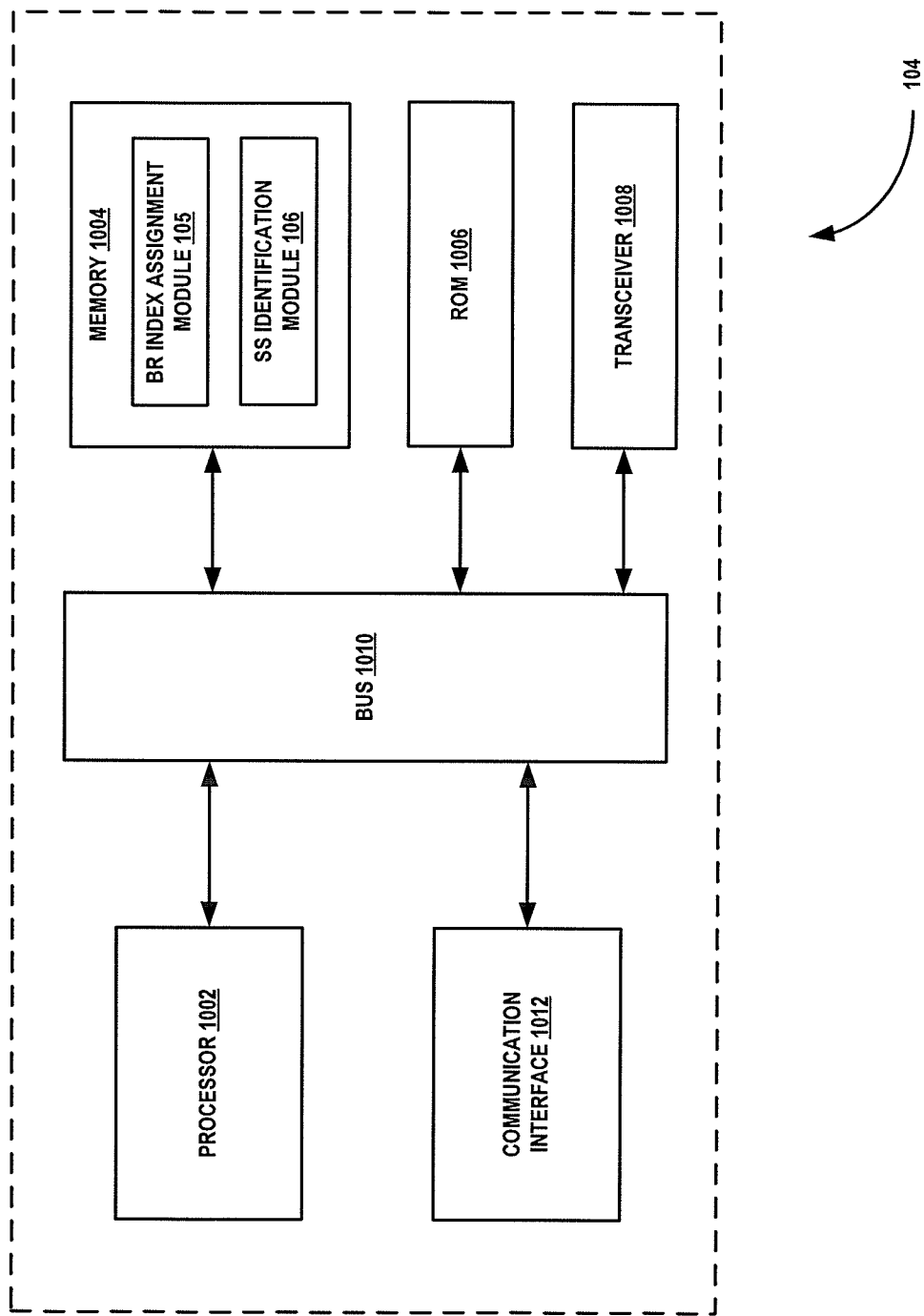
FIG. 10 is a block diagram of a base station showing various components for implementing embodiments of the present subject matter.

FIG. 10 is a block diagram of the base station 104 showing various components for implementing embodiments of the present subject matter. In FIG. 10, the base station 104 includes a processor 1002, memory 1004, a read only memory (ROM) 1006, a transceiver 1008, a bus 1010, and a communication interface 1012.

The processor 1002, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1002 may also include embedded controllers, such as generic or programmable logic devices or arrays, application specific integrated circuits, single-chip computers, smart cards, and the like.

The memory 1004 and the ROM 1006 may be volatile memory and non-volatile memory. The memory 1004 includes the BR index assignment module 105 for assigning BR indexes to connections associated with a subscriber station(s) and a SS identification module 106 for identifying a subscriber station based on information encoded in a quick access message, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Embodiments of the present subject matter may be implemented in conjunction with modules, including functions, procedures, data structures, and application programs, for performing tasks, or defining abstract data types or low-level hardware contexts. The BR index assignment module 105 and the SS identification module 106 may be stored in the form of machine-readable instructions on any of the above-mentioned storage media and may be executable by the processor 1002. For example, a computer program may include machine-readable instructions capable of assigning BR indexes to connections associated with a subscriber station(s) and identifying a subscriber station based on information encoded in a quick access message, according to the teachings and herein described embodiments of the present subject matter. In one embodiment, the program may be included on a compact disk-read only memory (CD-ROM) and loaded from the CD-ROM to a hard drive in the non-volatile memory.

The transceiver 1008 may be capable of transmitting an assigned BR index to one or more subscriber stations during connection establishment and receiving a quick access message from one or more subscriber stations during a three-step BR procedure. The bus 1010 acts as an interconnect between various components of the base station 104. The components such as the communication interface 1012, the display 1014, the input device 1016, and the cursor control 1018 are well known to the person skilled in the art and hence the explanation thereof is omitted.

The present embodiments have been described with reference to specific example embodiments. It will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to identify a subscriber station by a base station in a wireless network, the method comprising:
   determining whether a station identifier (STID) is shared among multiple subscriber stations;
   assigning different bandwidth request (BR) indexes to the multiple subscriber stations if the multiple subscriber stations share the STID, the different BR indexes being assigned based on predefined BR indexes; and
   identifying the subscriber station based on an assigned BR index and the shared STID in an access message received from the subscriber station.

2. The method of claim 1, further comprising:
   identifying the subscriber station based on a STID received in the access message if the STID received in the access message is uniquely assigned to the subscriber station.

3. An apparatus configured to identify a subscriber station in a wireless network, the apparatus comprising:
   a controller configured to:
      determine whether a station identifier (STID) is shared among multiple subscriber stations,
      assign different BR indexes to the multiple subscriber stations if the multiple subscriber stations share the STID, wherein the different BR indexes are assigned based on predefined BR indexes, and
      identify the subscriber station based on an assigned BR index and the shared STID in an access message received from the subscriber station.

4. The apparatus of claim 3, wherein the controller is configured to identify the subscriber station based on a STID received in the access message if the STID received in the access message is uniquely assigned to the subscriber station.

5. A method to perform a bandwidth request (BR) procedure by a subscriber station in a wireless network, the method comprising:
   receiving a station identifier (STID) and a BR index assigned from a base station; and
   transmitting an access message to the base station, the access message comprising the STID and the BR index, wherein the subscriber station is identified based on the STID and the BR index in the access message by the base station, wherein different BR indexes are assigned to multiple subscriber stations if the multiple subscriber stations share the STID, and wherein the different BR indexes are assigned based on predefined BR indexes.

6. A subscriber station configured to perform a bandwidth request (BR) procedure in a wireless network, the subscriber station comprising:
   a controller configured to control the subscriber station to receive a station identifier (STID) and a BR index assigned from a base station, and transmit an access message to the base station, the access message comprising the STID and the BR index, wherein the subscriber station is identified based on the STID and the BR index in the access message by the base station, wherein different BR indexes are assigned to multiple subscriber stations if the multiple subscriber stations share the STID, and wherein the different BR indexes are assigned based on predefined BR indexes.

* * * * *